US005989750A

United States Patent [19]

Ohba et al.

[11] Patent Number: 5,989,750

[45] Date of Patent: Nov. 23, 1999

[54] LEAD-ACID BATTERY SEPARATOR AND METHOD FOR PRODUCING THEREOF

[75] Inventors: Katsumi Ohba; Shin Ito, both of Shiga, Japan

[73] Assignee: G.S. Kasei Kogyo K.K., Shiga, Japan

[21] Appl. No.: 08/938,556

[22] Filed: Sep. 26, 1997

[30] Foreign Application Priority Data

Sep. 26, 1996 [JP] Japan .................................... 8-277213

[51] Int. Cl.[6] ...................................................... H01M 2/16

[52] U.S. Cl. .......................... 429/251; 429/143; 429/146; 264/331.11

[58] Field of Search .................................... 429/143, 146, 429/251, 252; 264/331.11

[56] References Cited

U.S. PATENT DOCUMENTS

| | | | |
|---|---|---|---|
| 4,264,691 | 4/1981 | O'Rell et al. | 429/251 X |
| 4,363,856 | 12/1982 | Waterhouse | 429/143 |
| 4,482,617 | 11/1984 | Le Bayon et al. | 429/143 |
| 5,180,647 | 1/1993 | Rowland et al. | 429/252 |
| 5,759,927 | 6/1998 | Meeker | 264/331.11 X |

*Primary Examiner*—Stephen Kalafut
*Attorney, Agent, or Firm*—Sughrue, Mion, Zinn, Macpeak & Seas, PLLC

[57] ABSTRACT

A separator contains thermoplastic synthetic fiber, and acid-resisting oxidation-resisting inorganic filler, wherein the cumulative volume of pores having a pore size not smaller than 1 μm is not larger than 20% of the cumulative volume of all pores, and the maximum pore size is not larger than 10 μm.

11 Claims, 2 Drawing Sheets

3

2

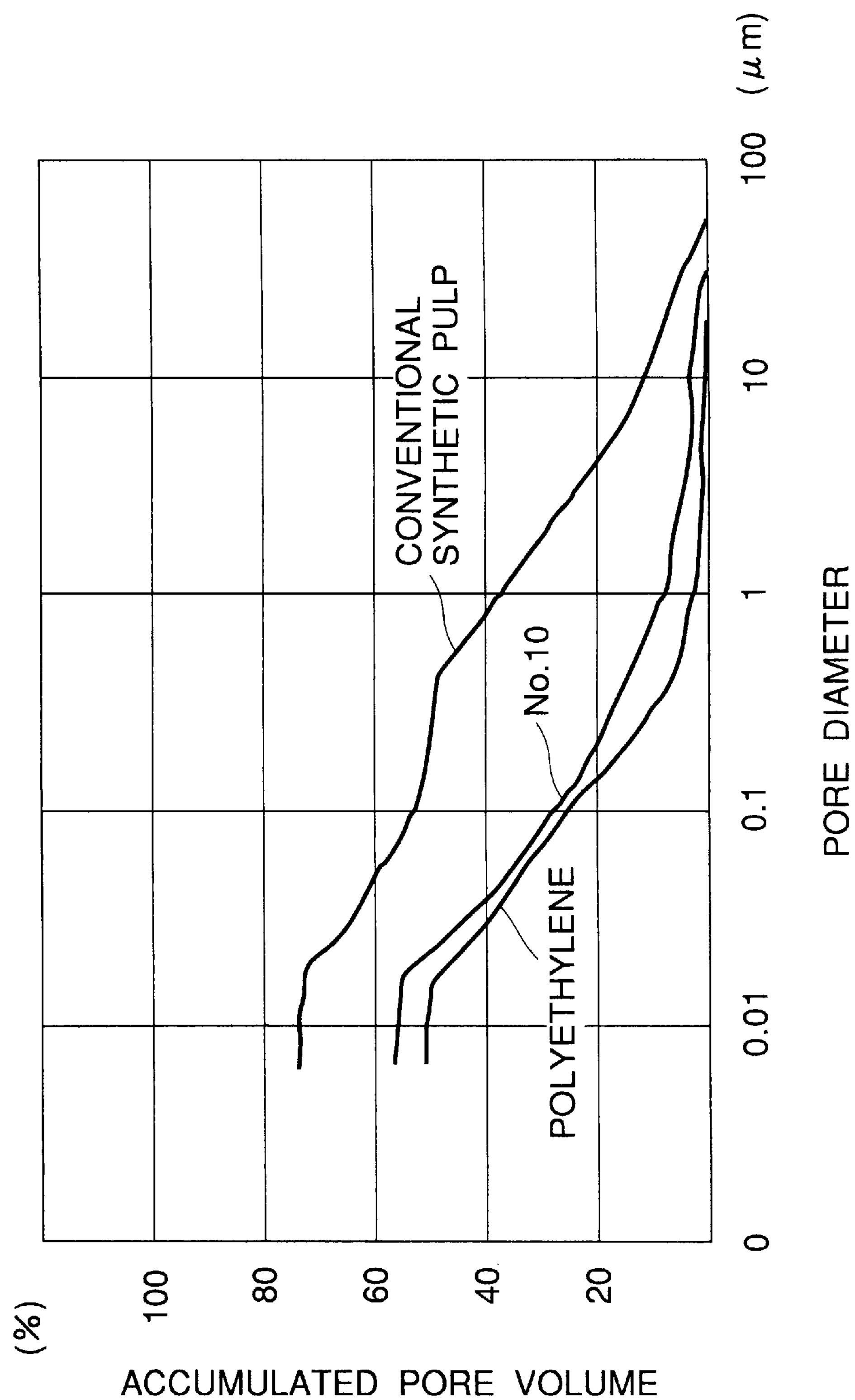
FIG.1
CONVENTIONAL
SYNTHETIC PULP
No.10
POLYETHYLENE
ACCUMULATED PORE VOLUME
(%)
100
80
60
40
20
0
0.01
0.1
1
10
100
(μm)
PORE DIAMETER

LEAD-ACID BATTERY SEPARATOR AND METHOD FOR PRODUCING THEREOF

BACKGROUND OF THE INVENTION

1. Field of the Invention

The present invention relates to a lead-acid battery separator.

2. Description of the Related Art

The method for producing a separator mainly used in a lead-acid battery is classified into two groups, namely, a method using an extrusion molding apparatus to form a sheet-like separator (U.S. Pat. Nos. 3,351,495 and 5,336,573), and a method using paper making process to form a sheet-like separator (U.S. Pat. No. 4,367,271). In the former, after ultra-high-molecular-weight polyethylene powder, silica and petroleum oil are heated, melted and kneaded and the mixture is extruded in the form of a sheet by an extrusion molding apparatus, a major part of petroleum oil is extracted with an organic solvent to obtain porosity to thereby form a so-called polyethylene separator. In the latter, binder is mixed with thermo plastic synthetic fiber and inorganic filler as main components and sheet-making is performed by paper making process to thereby form a so-called synthetic pulp separator. The synthetic pulp separator is generally stuck to a glass mat in use.

In recent years, the separator for a lead-acid battery, especially for a SLI battery has been required (1) to be lower in electrical resistance, (2) to have excellent oxidation resistance at a high temperature, (3) to prevent penetration and short-circuiting with an active material, (4) to have structures such as a more reliable shape (for example, the shape of a envelope), etc., because of a countermeasure against Products Liability and (5) to be inexpensive.

(1) As the separator low in electrical resistance, a separator more excellent in cold start characteristic of the battery has been required with the advance of down sizing of the battery.

(2) Oxidation resistance has been required not only with the increase in the frequency of use of the battery under a high temperature with the advance of reduction in space of underhood but also with the advance of motorization in tropical regions such as Southeast Asia, etc.

(3) With respect to the penetration and short-circuiting, electric power consumption due to the key off current in apparatuses with the increase of electric equipments, etc. has become to be hardly ignored. Accordingly, named hydrous short circuit has been actualized.

(4) A structure in which a sense of security is given by means of enveloping electrode plates or has a tendency to be welcomed with a favorable impression.

(5) The polyethylene separator requires a long time for petroleum oil extraction with an organic solvent and, further, a high expense is required for equipment and as a running cost because an apparatus for recovering the organic solvent and petroleum oil is needed. On the other hand, the synthetic pulp separator is made expensive because the synthetic pulp separator needs a stuck glass mat.

The polyethylene separator is apt to be oxidized because a network constituting pores is a polyethylene thin film. Particularly under a high temperature, deterioration is accelerated so that many cracks give rise in the separator, thereby causing to short the lifetime of the battery.

Further, it is generally considered that a separator having a smaller pore size is better to prevent the penetration of an active material causing short-circuiting. The aforementioned separator is however poor in diffusion of the electrolyte because the pores are too small. Accordingly, a stratification of electrolyte occurs to cause shortening of lifetime.

The polyethylene separator has the following defects. A great deal of care and a large equipment cost are required for prevention of the risk of a fire and for prevention of the pollution of the environment in a production process because of use of petroleum oil and an organic solvent. Further, the electrolyte in the battery will be contaminated with oil remaining in the separator, which oil is necessary for improvement of acid resistance of the separator.

In the synthetic pulp separator, the cumulative volume of pores having a pore size not smaller than 1 μm is 40–60% of the cumulative volume of all pores. Because the pore size is too large to prevent the penetration of an active material, penetration short-circuiting occurs when discharge is deep. Further, to prolong the lifetime of the battery, the synthetic pulp separator must be generally used in combination with a glass mat. In that case, there is a defect that cold start characteristics can be obtained with much difficulty because evolved gas from electrodes will remain in the glass mat as bubbles (so-called bubble holding phenomenon).

SUMMARY OF THE INVENTION

It is an object of the present invention to provide a separator which is particularly excellent both in high-rate discharge at low-temperature and in lifetime under a high temperature and which can be used in the form of an envelope.

A lead-acid battery separator according to the present invention comprises: thermoplastic synthetic fiber, and acid-resisting/oxidation-resisting inorganic filler; wherein the cumulative volume of pores having a pore size not smaller than 1 μm in a pore size distribution is not larger than 20% of the cumulative volume of all pores, and the maximum pore size is not larger than 10 μm.

The separator according to the present invention can be produced inexpensively and safely and can be used in the form of an envelope.

Furthermore, because a lead-acid battery very excellent both in high-rate discharge characteristics at low-temperature and in endurance at a high temperature is obtained, the industrial value of the separator is very high.

BRIEF DESCRIPTION OF THE DRAWING

FIG. 1 is a graph of pore size distributions measured by a mercury pressure porosimeter upon a separator according to the present invention and conventional separators.

DETAILED DESCRIPTION OF THE INVENTION

Figure 2A:
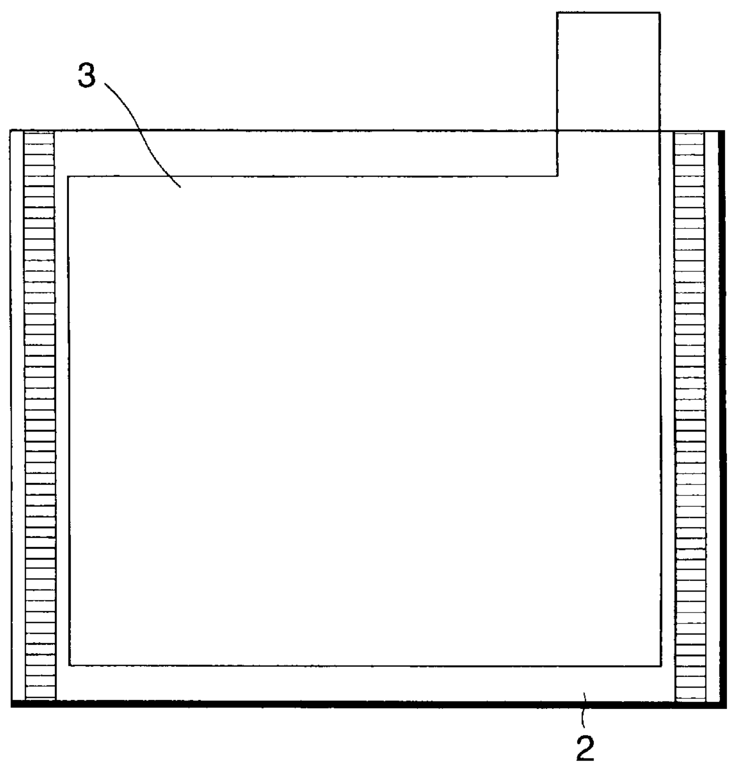
FIGS. 2A to 2C are schematic diagrams showing a separator according to the present invention.

Detailed description of the present invention will be described as follows.

In the present invention, a lead-acid battery separator in which: 15–60%, preferably 30–50%, by weight of thermoplastic synthetic resin, 40–85%, preferably 50–70%, by weight of acid-resisting oxidation-resisting inorganic filler, and 10% by weight or less, preferably 1% by weight or more, more preferably 2–5% by weight, of binder added thereto with respect to the total weight of the fiber and inorganic filler as occasion demands, are homogenized and subjected to paper-making; and the sheet thus obtained is heated and pressed so as to be able to be used in the form of an envelope. Further, in the separator, the cumulative volume of pores having a pore size not smaller than 1 μm in a pore size distribution is not larger than 20% of the cumulative volume of all pores, and the maximum pore size is not larger than 10 μm. In this occasion, melted synthetic resin may be extruded onto the separator to thereby form ribs. Incidentally, the maximum pore size measured by a bubble point method is selected to be not larger than 10 μm.

In the lead-acid battery separator, the separator preferably contains, as constituent members, 15–60% by weight of the thermoplastic synthetic fiber, and 40–85% by weight of the acid-resisting oxidation-resisting inorganic filler, and the separator further contains 10% or less by weight of binder with respect to the total weight of the constituent members.

In the lead-acid battery separator according to the present invention, the thermoplastic synthetic fiber is preferably at least one of polyolefin fiber, polyester fiber and polyacrylonirile fiber having a mean diameter of from 3 to 30 μm.

In the lead-acid battery separator according to the present invention, the acid-resisting oxidation-resisting inorganic filler is preferably at least one of inorganic powder and inorganic fiber.

In the lead-acid battery separator according to the present invention, the inorganic powder is preferably at least one of silica having a specific surface area not smaller than 100 $m^2$/g and diatomaceous earth having a mean particle size of from 1 to 30 μm, and the silica is blended in an amount of more than 50% in the total mixture amount of the inorganic powder.

In the lead-acid battery separator according to the present invention, the inorganic fiber is preferably at least one of glass fiber and ceramic fiber having a mean fiber diameter of from 0.6 to 30 μm.

In the lead-acid battery separator according to the present invention, the binder is preferably at least one of polyacrylic resin and synthetic rubber latex.

In the lead-acid battery separator according to the present invention, the polyacrylic resin is preferably PMMA (polymethyl methacrylate resin) and PAN (polyacrylonitrile ( ), and the synthetic rubber latex is preferably SBR (styrene-butadiene rubber) and NBR (acrylonitrile rubber).

In the lead-acid battery separator according to the present invention, APP (atactic polyproplylene) compound ribs of acid-resisting oxidation-resisting synthetic resin may be formed on a surface of the separator.

In the lead-acid battery separator according to the present invention, the lead-acid battery separator may be formed as an envelope-like separator.

In a method for producing a lead-acid battery separator according to the present invention, thermoplastic synthetic fiber, acid-resisting oxidation-resisting inorganic filler and, if necessary, binder are mixed to form a sheet; and the sheet is pressed by pressure in a range of from 10 to 100 Kgf/cm while keeping the sheet at a temperature in a range of from 120 to 160° C.

As a result, there are excellent effects as will be shown in the following paragraphs.

(1) Because a large-pore-size portion is reduced greatly compared with the conventional synthetic pulp separator, there is an effect to prevent the penetration of an active material. Even if no glass mat is used, good endurance can be obtained.

(2) If no glass mat is used, high-rate discharge characteristics at low-temperature is excellent because the bubble is removed easily.

(3) When the pore size distribution is controlled by heating and pressing, the pore size suitable for diffusion of the electrolyte can be obtained. Accordingly, the diffusion of the electrolyte is not prevented comparing to the polyethylene separator, so that the endurance will not be shortened due to the stratification.

(4) The separator according to the present invention is excellent in acid resistance, oxidation resistance because the network is constituted by thick fiber compared with the thin film in the polyethylene separator. Accordingly, the separator according to the present invention is prevented from cracking due to acceleration of deterioration under a high temperature at a relatively early stage, unlike the polyethylene separator.

(5) Because no petroleum oil is used, there is no trouble that the electrolyte is contaminated with oil scum, unlike the polyethylene separator.

(6) Unlike the polyethylene separator, use of the organic solvent is not necessary in the production process. Accordingly, no consideration is necessary on the risk of a fire and the pollution of the environment.

(7) Unlike the polyethylene separator, extraction of petroleum oil is not necessary and no recovering apparatus is required in the process according to the present invention. Accordingly, no large equipmental cost is required.

(8) Because no glass mat is required to be used, there is an advantage that the cost is reduced.

The present invention will be described in further detail on the basis of examples.

Examples of the separator according to the present invention were produced in the following manner.

SWP (synthetic wood pulp; high density and wettable polyethylene fiber made by Mitsui Petrochemical Industries, Ltd.) having a mean fiber diameter of 10 μm, polyester fiber having a thickness of 1.5 d (denier) and a fiber length of 5 mm, and polyacrylonitrile fiber having a thickness of 1.5 d and a fiber length of 5 mm were used as the thermoplastic synthetic fiber.

Glass fiber having a mean fiber diameter of 4 μm, silica (water-containing amorphous silicon dioxide) having a specific surface area of about 180 $m^2$/g and diatomaceous earth having a mean diameter of 8 μm were used as the inorganic filler.

Various mixtures were formed in the mixture proportions shown in Table 1. Using a known paper-making machine, each of the mixtures was scooped to form a paper like sheet. The paper-like mixtures were heated and pressed by a roller press machine under the condition of 140° C. and 20 Kgf/cm to thereby produce five examples of the separator according to the present invention. Table 1 shows the mixture proportions of materials constituting the thus produced separators.

Incidentally, MMA (methyl methacrylate resin) binder was added by an amount of 3% with respect to the total weight of the thermoplastic synthetic resin fiber and inorganic filler.

Table 2 shows results of an oxidation resistance test carried out using these five kinds of separators according to the present invention and using a conventional synthetic pulp separator (sample No. 6) and a conventional ribbed polyethylene separator (sample No. 7) as comparative examples, and the typical characteristics of the respective separators.

TABLE 1

| Sample No. | 1 | 2 | 3 | 4 | 5 |
|---|---|---|---|---|---|
| SWP (wt %) | 15 | 25 | 25 | 45 | 45 |
| polyester fiber (wt %) | 10 | 15 | 15 | — | 15 |
| polyacrylonitrile fiber (wt %) | — | — | — | 15 | — |
| glass fiber (wt %) | 10 | 5 | 5 | 10 | 10 |
| silica (wt %) | 65 | 55 | 30 | 30 | 30 |
| diatomaceous earth (wt %) | — | — | 25 | — | — |
| MMA binder (wt %) | 3 | 3 | 3 | 3 | 3 |

TABLE 2

| | Examples according to the present invention | | | | | Comparative Examples | |
|---|---|---|---|---|---|---|---|
| Sample No. | 1 | 2 | 3 | 4 | 5 | 6 | 7*1 |
| Basis weight (g/m$^2$) | 118 | 120 | 122 | 121 | 120 | 120 | 186 (150) |
| Thickness (mm) | 0.28 | 0.25 | 0.23 | 0.20 | 0.19 | 0.31 | 0.90 (0.25) |
| Density (g/cm$^3$) | 0.42 | 0.48 | 0.53 | 0.61 | 0.63 | 0.39 | (0.60) |
| Oxidation resisting time*2 | 402 | 511 | 310 | 298 | 308 | 154 | 259 |
| Evaluation of appearance after oxidation resisting test*3 | B | A | B | B | B | C | D |

*1The parenthesis () in the characteristic value of the polyethylene separator expresses the value of a flat plate portion except ribbed portions.
*2In the oxidation resisting test, a sample which is put between two lead alloy electrodes so that a load of 20 kgf/dm$^2$ is applied to the sample is set in an electrolyte tank containing dilute sulfuric acid (specific gravity 1.300/20° C.) poured therein. The oxidation resistance time is expressed by the current conduction time before the terminal voltage measured at intervals of 4 hours when a constant current of 2.5 A is supplied while the temperature of the electrolyte is kept at 75 ± 2° C. reaches 2.6 V or the voltage drop between the measured voltage and the previously measured voltage reaches 0.2 V.
*3Total evaluation with respect to crack, penetration of active material and brittleness-- A: excellent, B: very good, C: good, and D: failure.

It was apparent from Table 2 that the oxidation resisting time in each of the separators according to the present invention was not shorter than about twice the oxidation resisting time of the conventional synthetic pulp separator without glass mat and was longer in a range of from a 15% raise to about twice the oxidation resisting time of the conventional rib-containing polyethylene separator, and that each of the separators according to the present invention was also excellent in state observed appearance evaluation after the oxidation resistance test. Particularly No. 2 was most excellent. This is because the mixture balance between the thermoplastic synthetic fiber and the inorganic filler was most reasonable.

Then, separators were prepared by use of the composition of No. 2 sheet shown in Table 1 while the condition (temperature, pressure) of the roller press machine was changed. The thus prepared separators were subjected to an oxidation resistance test. Table 3 shows the results of test.

TABLE 3

| | Examples according to the present invention | | | | | Comparative Examples | |
|---|---|---|---|---|---|---|---|
| Sample No. | 8 | 9 | 10 | 11 | 12 | 6 | 7 |
| Temperature (° C.) | 120 | 120 | 140 | 140 | 160 | | |
| Linear Pressure (kgf/cm) | 20 | 60 | 20 | 60 | 20 | | |
| basis weight (g/m$^2$) | 120 | 121 | 120 | 122 | 121 | 120 | 186 (150) |
| Thickness (mm) | 0.27 | 0.22 | 0.25 | 0.17 | 0.19 | 0.31 | 0.90 (0.25) |
| Density (g/cm$^2$) | 0.44 | 0.55 | 0.48 | 0.72 | 0.64 | 0.39 | (0.60) |
| Oxidation resisting time (75° C.) | 405 | 527 | 511 | 589 | 556 | 154 | 259 |
| Evaluation of appearance after oxidation resisting test*2 | B | A | A | A | A | C | D |
| Electrical resistance ($10^{-4}\Omega dm^2$/sheet) | 5 | 8 | 7 | 12 | 11 | 8 | 6 |

*1The parenthesis ( ) in the characteristic value of the polyethylene separator expresses the value of a flat plate portion except ribbed portions.
*2Total evaluation with respect to crack, penetration of active material and brittleness-- A: excellent, B: very good, C: good, and D: failure.

It was apparent from Table 3 that a stable and good result was obtained in the separator produced in the condition of 120–160° C. and 20–60 Kgf/cm.

FIG. 1 shows results of pore size distributions measured by a mercury Pressure Porosimeter upon the separators according to the present invention, the conventional synthetic pulp separator and the conventional ribbed polyethylene separator. The cumulative volume of pores having a pore size not smaller than 1 $\mu$m in each of the separators according to the present invention was less than 20% whereas that in the synthetic pulp separator was more than 50%. As shown in Table 4, the maximum pore size measured by a bubble point method was 8 $\mu$m whereas the maximum pore size of the synthetic pulp separator was 18 $\mu$m.

TABLE 4

| | Separator | | |
|---|---|---|---|
| Item | Separator according to the present invention | Synthetic pulp separator | Ribbed polyethylene separator |
| Maximum pore size ($\mu$m) | 8 | 18 | 0.6 |

Figure 2B:
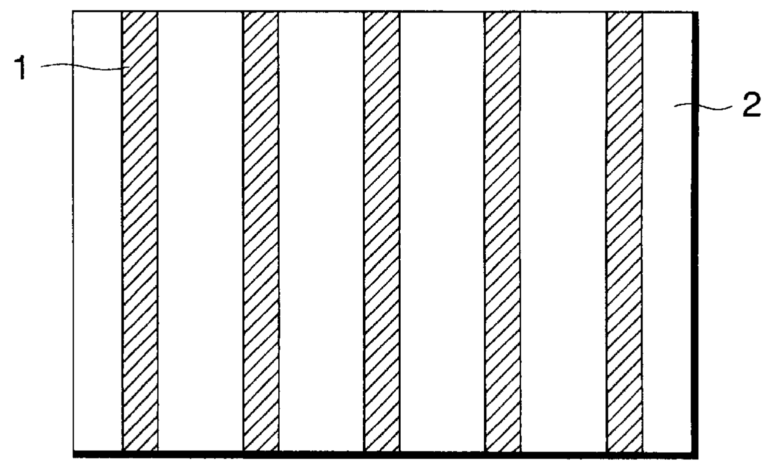
Figure 2C:
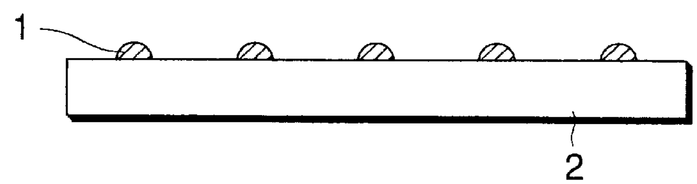

Next, using the separator of sample No. 10 according to the present invention, polypropylene ribs 1 were provided at intervals of 12 mm to thereby produce a separator 2 having a total thickness (including ribs) of 0.9 mm as shown in FIGS. 2A to 2C. After the separator 2 thus produced was installed in a 55 Ah/5HR 12V battery (corresponding to JIS-type 80D26) having seven positive electrode plates (3) and eight negative plates (3) per unit cell, a high-rate discharge test and a heavy-load endurance and light-load endurance test according to Japanese Industrial Standard (JISD5301) were carried out in an atmosphere of 75° C. Table 5 shows the results of the tests.

Incidentally, a lead-acid battery in which a glass mat was attached to the conventional synthetic pulp separator and a lead-acid battery of the same configuration except that the ribbed polyethylene separator was installed in the lead-acid battery were tested as comparative examples. In that case, plates for leaf type separator were used in the lead-acid battery of the type having the glass mat attached to the synthetic pulp separator whereas plates for an envelope type separator were used both in the lead-acid battery using the separator according to the present invention and in the separator using the ribbed polyethylene separator.

TABLE 5

| Result of test | | Separator according to the invention | Conventional separator: Ribbed polyethylene separator | Conventional separator: Synthetic pulp separator with glass mat |
|---|---|---|---|---|
| High-rate discharge (Temp.: −15° C.) | Voltage after 5 sec. (V) | 9.69 | 9.72 | 9.62 |
| (Current: 300 A) | Voltage after 30 sec. (V) | 9.65 | 9.69 | 9.59 |
| | Duration (minute) | 3.64 | 3.78 | 3.60 |
| JIS light-load endurance (Temp.: 75° C.) | Number of times (cycle) | 5760 | 2880 | 3360 |
| JIS heavy-load endurance (Temp.: 75° C.) | Number of times (cycle) | 520 | 320 | 360 |

It could be confirmed from the results of the test that the high-rate discharge characteristics at low-temperature of the lead-acid battery using the separator according to the present invention was more excellent than that of the lead-acid battery using the synthetic pulp separator with glass mat in the form of a leaf and that both the light-load endurance and heavy-load endurance of the lead-acid battery using the separator according to the present invention were very excellent compared with those of the lead-acid batteries using the conventional separators.

Incidentally, besides the above examples, separators were produced in the same manner as in the examples by using three kinds of thermoplastic synthetic fiber having mean fiber diameter of 3 μm, 20 μm and 30 μm, two kinds of silica (hydrous silica) having specific surface areas of 100 $m^2/g$ and 200 $m^2/g$, three kinds of diatomaceous earth having mean diameters of 1 μm, 15 μm and 30 μm, four kinds of inorganic fiber having mean fiber sizes of 0.6 μm, 10 μm, 20 μm and 30 μm. The typical characteristics of the separators were examined. After these separators were installed in batteries respectively, a high-rate discharge test at low-temperature and a JIS light-load endurance and heavy-load endurance test were carried out at an atmospheric temperature of 75° C. The same results as in the above examples were obtained.

What is claimed is:

1. A lead-acid battery separator comprising:

thermoplastic synthetic fiber, and acid-resisting oxidation resisting inorganic filler;

wherein the cumulative volume of pores having a pore size not smaller than 1 μm in a pore size distribution is not larger than 20% of the cumulative volume of all pores, and the maximum pore size is not larger than 10 μm.

2. A lead-acid battery separator according to claim 1, wherein said separator comprises, as constituent members, 15–60% by weight of said thermoplastic synthetic fiber, and 40–85% by weight of said acid-resisting oxidation-resisting inorganic filler, and said separator further comprises 10% by weight of binder with respect to the total weight of said constituent members.

3. A lead-acid battery separator according to claim 1, wherein said thermoplastic synthetic fiber comprises at least one of polyolefin fiber, polyester fiber and polyacrylonitrile fiber having a mean diameter of from 3 to 30 μm.

4. A lead-acid battery separator according to claim 1, wherein said acid-resisting oxidation-resisting inorganic filler comprises at least one of inorganic powder and inorganic fiber.

5. A lead-acid battery separator according to claim 4, wherein said inorganic powder comprises at least one of silica having a specific surface area not smaller than 100 $m^2/g$ and diatomaceous earth having a mean particle size of from 1 to 30 μm, and wherein when said silica is used it is blended in an amount of 50% or more in the total mixture amount of said inorganic powder.

6. A lead-acid battery separator according to claim 4, wherein said inorganic fiber comprises at least one of glass fiber and ceramic fiber having a mean fiber size of from 0.6 to 30 μm.

7. A lead-acid battery separator according to claim 2, wherein said binder comprises at least one of polyacrylic resin and rubber latex.

8. A lead-acid battery separator according to claim 7, wherein said polyacrylic resin comprises methyl methacrylate resin and said rubber latex comprises styrene-butadiene rubber.

9. A lead-acid battery separator according to claim 1, wherein atactic polypropylene ribs of acid-resisting oxidation-resisting are formed on a surface of said separator.

10. A lead-acid battery separator according to claim 1, wherein said lead-acid battery separator is formed as an envelope shaped separator.

11. A method for producing a lead-acid battery separator, comprising the steps of:

mixing thermoplastic synthetic fiber, acid-resisting oxidation-resisting inorganic filler and, if necessary, binder to form a sheet by a paper making method; and pressing said sheet by pressure in a range of from 10 to 100 Kgf/cm with press rolls while keeping said sheet at a temperature in a range of from 120 to 160° C.

* * * * *